(12) United States Patent
Bowers

(10) Patent No.: US 6,326,436 B2
(45) Date of Patent: Dec. 4, 2001

(54) FLUOROELASTOMER COMPOSITION HAVING EXCELLENT PROCESSABILITY AND LOW TEMPERATURE PROPERTIES

(75) Inventor: Stephen Bowers, St. Cergue (CH)

(73) Assignee: DuPont Dow Elastomers, L.L.C., Wilmington, DE (US)

( * ) Notice: Subject to any disclaimer, the term of this patent is extended or adjusted under 35 U.S.C. 154(b) by 0 days.

(21) Appl. No.: 09/727,793

(22) Filed: Dec. 1, 2000

Related U.S. Application Data

(63) Continuation-in-part of application No. 09/378,365, filed on Aug. 20, 1999.
(60) Provisional application No. 60/097,387, filed on Aug. 21, 1998.

(51) Int. Cl.$^7$ .................................................. C08F 251/00
(52) U.S. Cl. .................. 525/264; 525/248; 525/250; 526/247; 526/253; 526/255
(58) Field of Search .................................. 525/248, 250, 525/264; 526/247, 253, 255

(56) References Cited

U.S. PATENT DOCUMENTS

| | | |
|---|---|---|
| 3,331,622 | 7/1967 | Kometani et al. . |
| 3,331,623 | 7/1967 | Sianesi et al. . |
| 3,851,018 * | 11/1974 | Kelly .................................. 260/900 |
| 4,243,770 | 1/1981 | Tatemoto et al. . |
| 4,250,278 | 2/1981 | Suzuki et al. . |
| 4,259,463 | 3/1981 | Moggi et al. . |
| 4,361,678 | 11/1982 | Tatemoto et al. . |
| 4,489,196 | 12/1984 | Schmiegel . |
| 4,882,390 | 11/1989 | Grootaert et al. . |
| 4,912,171 | 3/1990 | Grootaert et al. . |
| 4,957,975 | 9/1990 | Carlson et al. . |
| 5,214,106 | 5/1993 | Carlson et al. . |
| 5,218,026 | 6/1993 | Toda et al. . |
| 5,260,393 | 11/1993 | Arcella et al. . |
| 5,478,902 | 12/1995 | Yamamoto et al. . |
| 5,591,804 | 1/1997 | Coggio et al. . |
| 5,648,429 | 7/1997 | Chlodini et al. . |
| 5,696,216 | 12/1997 | Kruger et al. . |
| 5,719,245 | 2/1998 | Yamamoto et al. . |
| 5,874,506 | 2/1999 | Tatsu et al. . |
| 5,948,868 * | 9/1999 | Albano et al. ........................ 525/276 |
| 6,071,564 * | 6/2000 | Marchetti et al. ................ 427/385.5 |

FOREIGN PATENT DOCUMENTS

| | | |
|---|---|---|
| 0 041 737 | 12/1981 | (EP) . |
| 1 496 084 | 12/1977 | (GB) . |
| WO95/15359 | 6/1995 | (WO) . |

OTHER PUBLICATIONS

W. W. Schmiegel, Crosslinking of Elastomeric Vinylidene Fluoride Copolymers With Nucleophiles, Angewandte Makromolekware Chemie. 76/77, 39–65, 1979.

Accession No. 1996–056129/199806, Derwent Publications Ltd., Abstract of Japanese Patent Publication No. JP 7316376 A.

Accession No. 1998–292271/199826. Derwent Publication Ltd., Abstract of Japanese Patent Publication No. JP 10101879 A.

\* cited by examiner

Primary Examiner—Helen L. Pezzuto

(57) ABSTRACT

Fluoroelastomers containing copolymerized units of vinylidene fluoride, perfluoro(alkyl vinyl)ether, 2-hydropentafluoropropene, and, optionally, tetrafluoroethylene, and having an iodine atom present at some polymer chain ends, exhibit excellent low temperature properties and processability when dual cured with both polyhydroxy compounds and organic peroxides.

16 Claims, No Drawings

FLUOROELASTOMER COMPOSITION HAVING EXCELLENT PROCESSABILITY AND LOW TEMPERATURE PROPERTIES

CROSS REFERENCE TO RELATED APPLICATIONS

This application is a continuation-in-part of U.S. application Ser. No. 09/378,365, filed Aug. 20, 1999 now allowed, which claims the benefit of U.S. Provisional Application No. 60/097,387, filed Aug. 21, 1998.

FIELD OF THE INVENTION

This invention relates to fluoroelastomers that are capable of being crosslinked with both polyhydroxy compounds and organic peroxides to produce cured compositions having excellent processability and low temperature properties.

BACKGROUND OF THE INVENTION

Elastomeric fluoropolymers (i.e. fluoroelastomers) exhibit excellent resistance to the effects of heat, weather, oil, solvents and chemicals. Such materials are commercially available and are most commonly either dipolymers of vinylidene fluoride ($VF_2$) with hexafluoropropylene (HFP) or terpolymers of $VF_2$, HFP, and tetrafluoroethylene (TFE). While these di- and terpolymers have many desirable properties, including low compression set and excellent processability, their low temperature flexibility is not adequate for all applications.

It is known that incorporation of perfluorinated ether monomer units into vinylidene fluoride elastomers improves low temperature properties. For example, Carlson, in U.S. Pat. No. 5,214,106 discloses that when perfluoro(methyl vinyl)ether (PMVE) is substituted for HFP, the resultant $VF_2$/PMVE/TFE copolymers have glass transition temperature ($T_g$) values which are 10°–20° C. lower than those of the corresponding $VF_2$/HFP/TFE copolymers. $T_g$ is often used as an indicator of low temperature flexibility because polymers having low glass transition temperatures maintain elastomeric properties at low temperatures.

Kruger, in U.S. Pat. No. 5,696,216, discloses PMVE-containing fluoroelastomers that are similar to those disclosed by Carlson. Those disclosed by Kruger contain copolymerized units of $VF_2$; at least one fluorinated prepends and or fluorinated methyl vinyl ether; TFE; at least one perfluoro(polyoxyalkyl vinyl)ether, and a crosslinking site.

The compositions of Carlson and Kruger are most effectively crosslinked through use of peroxide cure systems. However, when compression molding equipment is used with peroxide curable $VF_2$/PMVE copolymers the compositions generally exhibit a tendency to stick to and foul the mold.

Tetrapolymers of $VF_2$, HFP, TFE and perfluoro(alkyl vinyl)ethers (PAVE) other than PMVE are also known to exhibit improved low temperature properties compared to terpolymers of $VF_2$, HFP and TFE. For example, Arcella, et al. in U.S. Pat. No. 5,260,393 disclose a tetrapolymer comprising copolymerized units of 48–65 wt. % $VF_2$, 21–36 wt. % HFP, 3–9 wt. % PAVE, and 0–17 wt. % TFE. The compositions can be cured using a bisphenol curing system and do not exhibit the mold fouling problems associated with peroxide cures of $VF_2$/PMVE copolymers. Similarly, British Patent 1,296,084 discloses fluoroelastomeric tetrapolymers containing copolymerized units of 48–65 wt. % $VF_2$, 8–23 wt. % HFP, 4–15 wt. % TFE, and 17–30 wt. % PAVE. Such compositions have good low temperature properties and are curable with bisphenols or amines. Although these tetrapolymers exhibit good low temperature properties, many applications require improved low temperature and processability performance.

Merely raising the PAVE content while lowering the HFP content is not a solution to the problem of improving low temperature performance of $VF_2$/HFP/PAVE/TFE terpolymers. This is because polymers wherein the level of HFP is below about 8–10 mole percent do not contain sufficient copolymerized monomer sequences consisting of HFP units flanked by $VF_2$ units to permit efficient crosslinking with bisphenols. As is well known in the art, efficient curing of $VF_2$/HFP-containing fluoroelastomers with a bisphenol/accelerator system is possible only when a ——$CH_2$-group in the polymer backbone is flanked by two perfluorinated carbons (e.g. $CF_2CF(CF_3)CH_2CF_2CF_2$), rendering the hydrogens acidic enough to be abstracted by base. The dehydrofluorinated polymers are easily crosslinked by bisphenols. Furthermore, as discussed by W. W. Schmiegel, in *Angewandte Makromolekulare Chemie*, 76/77, 39 (1979), completely eliminating HFP to form $VF_2$/TFE/PMVE terpolymers results in formation of monomer sequences consisting of TFE/$VF_2$/TFE; TFE/$VF_2$/PMVE; PMVE/$VF_2$/PMVE; and PMVE/$VF_2$/TFE. Although such sites readily undergo elimination of HF or $HOCF_3$ in the presence of base, the double bonds thus formed are not easily crosslinked by bisphenols or any other traditional crosslinking agents.

There thus exists an unfulfilled need in the art for a method of providing copolymers of $VF_2$, TFE, and PAVE that maintain optimum low temperature properties, but which exhibit low mold sticking characteristics, improved processability and are easily curable.

SUMMARY OF THE INVENTION

The present invention is directed to a curable composition comprising

A. a fluoroelastomer copolymer consisting essentially of copolymerized units of 23–65 weight percent vinylidene fluoride, 25–75 weight percent perfluoro(alkyl vinyl)ether, 0–30 weight percent tetrafluoroethylene, and 0.3–5 weight percent 2-hydropentafluoropropene; said fluoroelastomer copolymer having between 0.05 and 1 weight percent iodine chemically bound at copolymer chain ends;

B. a polyhydroxy crosslinking agent;

C. a cure accelerator;

D. an acid acceptor selected from the group consisting of metal oxides, metal hydroxides, and mixtures thereof, E. an organic peroxide; and F. a coagent.

A preferred embodiment of the curable compositions of the invention additionally comprises a modified silane coated mineral filler.

A further preferred embodiment of the curable compositions of the invention additionally comprises a molecular sieve.

DETAILED DESCRIPTION OF THE INVENTION

The copolymers employed in the compositions of the present invention are capable of undergoing crosslinking reactions with both polyhydroxy compounds and organic peroxides to form elastomeric compositions that exhibit unusually good low temperature properties and low mold sticking characteristics.

The polymer backbones of the copolymers consist essentially of copolymerized units of $VF_2$, PAVE, 2-hydropentafluoropropene (i.e. 1,1,3,3,3-pentafluoropropene, referred to herein as HPFP), and, optionally, TFE. That is, each of the first three monomers (and optionally TFE) must be present in the polymer chain, but higher order polymers, i.e. those containing other additional monomer units, the addition of which does not affect the basic and novel characteristics of the polymer, are also within the scope of the present invention. For example, the tetrapolymer $VF_2$/PAVE/TFE/HPFP can contain other copolymerized vinyl or olefin monomers such as vinyl fluoride, trifluoroethylene, trifluoropropene, chlorotrifluoroethylene, alkyl vinyl ether, vinyl acetate, vinyl chloride, ethylene, and propylene, generally in quantities of up to about 5 wt. %.

In addition, the fluoroelastomer copolymers used in this invention contain between 0.05 and 1 wt. % (preferably between 0.08 and 0.3 wt. %) iodine which is bound to copolymer chain ends, the iodine being introduced via use of an iodine-containing chain transfer agent during polymerization.

The fluoroelastomers employed in the curable compositions of the invention contain between 23–65 wt. % copolymerized vinylidene fluoride units, preferably between 33–55 wt. % of such units. If less than 23 wt. % vinylidene fluoride units are present, the polymerization rate is very slow. In addition, good low temperature flexibility cannot be achieved. Vinylidene fluoride levels above 65 wt. % result in polymers that contain crystalline domains and are characterized by poor low temperature compression set resistance and reduced fluids resistance.

Perfluoro(alkyl vinyl)ethers (PAVE) suitable for use as comonomers include those of the formula

  (I)

where $R_f'$ and $R_f''$ are different linear or branched perfluoroalkylene groups of 2–6 carbon atoms, m and n are independently 0–10, and $R_f$ is a perfluoroalkyl group of 1–6 carbon atoms.

A preferred class of perfluoro(alkyl vinyl)ethers includes compositions of the formula

  (II)

where X is F or $CF_3$, n is 0–5, and $R_f$ is a perfluoroalkyl group of 1–6 carbon atoms.

A most preferred class of perfluoro(alkyl vinyl)ethers includes those ethers wherein n is 0 or 1 and $R_f$ contains 1–3 carbon atoms. Examples of such perfluorinated ethers include perfluoro(methyl vinyl)ether and perfluoro(propyl vinyl)ether. Other useful monomers include compounds of the formula

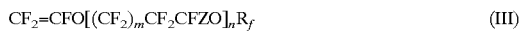  (III)

where $R_f$ is a perfluoroalkyl group having 1–6 carbon atoms, m=0 or 1, n=0–5, and Z=F or $CF_3$. Preferred members of this class are those in which $R_f$ is $C_3F_7$, m=0, and n=1.

Additional perfluoro(alkyl vinyl)ether monomers include compounds of the formula

  (IV)

where m and n independently=1–10, p=0–3, and x=1–5. Preferred members of this class include compounds where n=0–1, m=0–1, and x=1.

Examples of useful perfluoro(alkoxy vinyl)ethers include

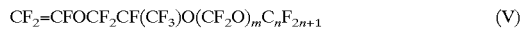  (V)

where n=1–5, m=1–3, and where, preferably, n=1.

Mixtures of perfluoro(alkyl vinyl)ethers and perfluoro(alkoxy vinyl) ethers may also be used.

The perfluoro(alkyl vinyl)ether content of the fluoroelastomers of the invention ranges from 25–75 wt. %. If perfluoro(methyl vinyl)ether is used, then the fluoroelastomer preferably contains between 30–44 wt. % copolymerized perfluoroether units. If less than 25 wt. % perfluoro(alkyl vinyl)ether is present, the low temperature properties of the fluoroelastomers are adversely affected.

Copolymerized units of tetrafluoroethylene may also be present in the fluoroelastomers used in the invention at levels up to 30 wt. %. The presence of copolymerized units of TFE is desirable for the purpose of increasing fluorine content without unduly compromising low temperature flexibility. High fluorine content promotes good fluid resistance. If TFE is present as a comonomer, it is preferably copolymerized in amounts of at least 3 wt. %. Levels of 3 wt. % or greater TFE lead to improved fluid resistance in some end use applications. TFE levels above 30 wt. % result in some polymer crystallinity which affects low temperature compression set and flexibility.

The fourth copolymerized monomer unit in the copolymers employed in the invention is 2-hydropentafluoropropene (HPFP). A particular characteristic of the HPFP monomer is that it acts as an independent cure site monomer that takes part in crosslinking reactions with polyhydroxylic curing agents. Polymers that contain copolymerized HPFP monomer units do not require the presence of copolymerized monomer sequences of $VF_2$ flanked by perfluoromonomers (e.g. $HFP/VF_2HFP$) for initiation of dehydrofluorination. Introduction of copolymerized HPFP units into the $VF_2$/HFP copolymer chain creates sites that exceed the reactivity of $HFP/VF_2$/HFP sequences. HFP is a perfluorinated monomer and thus contains no hydrogens. It cannot function as an independent cure site monomer because it is incapable of undergoing dehydrofluorination. In fact, HFP-containing $VF_2$ copolymers of PMVE must contain at least about 8–10 wt. % HFP in order to provide a sufficient concentration of $—CF_2CF(CF_3)$ $CH_2CF_2CF_2$- sequences for effective cure by polyhydroxylic compounds.

HPFP/TFE/PMVE terpolymers are disclosed in U.S. Pat. Nos. 5,478,902 and 5,719,245. In addition, HPFP/TFE/PMVE tetrapolymers containing not more than about 20 mole percent of an additional monomer are disclosed therein. Compositions containing high levels of $VF_2$ comonomer are not disclosed. In addition, U.S. Pat. No. 5,874,506 discloses $VF_2$/TFE/HFP/HPFP tetrapolymers. The polymers must contain 16–30 mol % HFP. Pentapolymers containing up to 5 mol % of additional comonomers are also disclosed therein. The tetrapolymers and pentapolymers disclosed in this reference do not exhibit good low temperature properties and have very different fluids resistance from the polymers of the present invention.

Because of the ease of hydrogen abstraction in HPFP-containing $VF_2$ fluoroelastomers, the polymers employed in the present invention require only low levels of HPFP, i.e. 0.3–5 wt. %, to promote efficient polyhydroxylic cures. This permits adjustment of other comonomer levels to maximize particular physical properties. Thus, the copolymers used in the present invention exhibit excellent cure characteristics with only low levels of HPFP. They maintain the high temperature compression set resistance properties and excellent cure response characteristic of polymers having significant amounts of copolymerized $VF_2$. Further, they exhibit a combination of excellent low temperature properties and processability not found in prior art fluoroelastomers. Preferably levels of HPFP will be between 0.7 and 3.0 wt. %.

The polymers employed in this invention may be prepared using free radical batch or semi-batch, or continuous free radical emulsion polymerization processes. They may also be prepared by free radical suspension polymerization processes.

For example, if a continuous emulsion process is utilized, the polymers are generally prepared in a continuous stirred tank reactor. Polymerization temperatures may be in the range of 40° to 145° C., preferably 1000 to 135° C. at pressures of 2 to 8 MPa. Residence times of 20 to 60 minutes are preferred. Free radical generation may be effected through use of a water-soluble initiator such as ammonium persulfate, either by thermal decomposition or by reaction with a reducing agent such as sodium sulfite. An inert surface-active agent such as ammonium perfluorooctanoate may be utilized to stabilize the dispersion, usually in conjunction with addition of a base such as sodium hydroxide or a buffer such as disodium phosphate to control pH in the range 3 to 7. Unreacted monomer is removed from the reactor effluent latex by vaporization at reduced pressure. Polymer is recovered from the stripped latex by coagulation. For example, coagulation may be effected by reducing latex pH to about 3 by addition of acid, then adding a salt solution, such as an aqueous solution of calcium nitrate, magnesium sulfate, or potassium aluminum sulfate, to the acidified latex. The polymer is separated from the serum, then washed with water and subsequently dried. After drying, the product may be cured.

Chain transfer agents may be used in the polymerization in order to control the molecular weight distribution of the resulting polymers. Examples of chain transfer agents include isopropanol; methyl ethyl ketone; ethyl acetate; diethyl malonate; isopentane; 1,3-diiodoperfluoropropane; 1,4-diiodoperfluorobutane; 1,6-diiodoperfluorohexane; 1,8-diiodoperfluorooctane; methylene iodide; trifluoromethyl iodide; perfluoro(isopropyl)iodide; and perfluoro(n-heptyl) iodide.

Polymerization in the presence of iodine-containing chain transfer agents results in a copolymer with one or two iodine atoms per fluoroelastomer copolymer chain, bound at the chain ends (see for example U.S. Pat. Nos. 4,243,770 and 4,361,678). Such polymers are also curable with an organic peroxide and they may have improved flow and processability compared to polymers made in the absence of a chain transfer agent.

An aspect of the present invention is a curable composition that comprises the above-described copolymers, a polyhydroxylic curing agent and an organic peroxide curing agent.

Any of the known polyhydroxylic aromatic crosslinking agents that require accelerators for satisfactory cure rates are suitable for use with the fluoroelastomers of the present invention. The crosslinking agent is usually added in amounts of from about 0.5–4 parts by weight per hundred parts by weight fluoroelastomer (phr), usually 1–2.5 phr. Preferred crosslinking agents are di- tri-, tetrahydroxybenzenes, naphthalenes, anthracenes and bisphenols of the formula

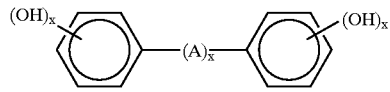

where A is a stable divalent radical, such as a difunctional aliphatic, cycloaliphatic, or aromatic radical of 1–13 carbon atoms, or a thio, oxy, carbonyl, sulfinyl, or sulfonyl radical; A is optionally substituted with at least one chlorine or fluorine atom; x is 0 or 1; n is 1 or 2 and any aromatic ring of the polyhydroxylic compound is optionally substituted with at least one atom of chlorine, fluorine, or bromine, a —CHO group, or a carboxyl or acyl radical (e.g. a —COR where R is OH or a $C_1$-$C_8$ alkyl, aryl, or cycloalkyl group). It will be understood from the above formula describing bisphenols that the —OH groups can be attached in any position (other than number one) in either ring. Blends of two or more such compounds can also be used.

Referring to the bisphenol formula shown in the previous paragraph, when A is alkylene, it can be, for example, methylene, ethylene, chloroethylene, fluoroethylene, difluoroethylene, 1,3-propylene, 1,2-propylene, tetramethylene, chlorotetramethylene, fluorotetramethylene, trifluorotetramethylene, 2-methyl-1,3-propylene, 2-methyl-1,2-propylene, pentamethylene, and hexamethylene. When A is alkylidene, it can be for example ethylidene, dichloroethylidene, difluoroethylidene, propylidene, isopropylidene, trifluoroisopropylidene, hexafluoroisopropylidene, butylidene, heptachlorobutylidene, heptafluorobutylidene, pentylidene, hexylidene, and 1,1-cyclohexylidene. When A is a cycloalkylene radical, it can be for example 1,4-cyclohexylene, 2-chloro-1,4-cyclohexylene, 2-fluoro-1,4-cyclohexylene, 1,3-cyclohexylene, cyclopentylene, chlorocyclopentylene, fluorocyclopentylene, and cycloheptylene. Further, A can be an arylene radical such as m-phenylene, p-phenylene, 2-chloro-1,4-phenylene, 2-fluoro-1,4-phenylene, o-phenylene, methylphenylene, dimethylphenylene, trimethylphenylene, tetramethylphenylene, 1,4-naphthylene, 3-fluoro-1,4-naphthylene, 5-chloro-1,4-naphthylene, 1,5-naphthylene, and 2,6-naphthylene. Bisphenol AF (sometimes referred to as 4,4'-(hexafluoroisopropylidene)diphenol or as 4,4'-(2,2,2-trifluoro-1-(trifluoromethyl)ethylidene)bisphenol) is a preferred polyhydroxylic curing agent.

Other useful crosslinking agents include hydroquinone, dihydroxybenzenes such as catechol, resorcinol, 2-methyl resorcinol, 5-methyl resorcinol, 2-methyl hydroquinone, 2,5-dimethyl hydroquinone; 2-t-butyl hydroquinone; and 1,5-dihydroxynaphthalene.

Additional polyhydroxy curing agents include alkali metal salts of bisphenol anions, quaternary ammonium salts of bisphenol anions and quaternary phosphonium salts of bisphenol anions. For example, the salts of bisphenol A and bisphenol AF. Specific examples include the disodium salt of bisphenol AF, the dipotassium salt of bisphenol AF, the monosodium monopotassium salt of bisphenol AF and the benzyltriphenylphosphonium salt of bisphenol AF. Quaternary ammonium and phosphonium salts of bisphenol anions and their preparation are discussed in U.S. Pat. Nos. 4,957, 975 and 5,648,429.

In addition, derivatized polyhydroxy compounds, such as diesters, are useful crosslinking agents. Examples of such compositions include diesters of phenols, such as the diacetate of bisphenol AF, the diacetate of sulfonyl diphenol, and the diacetate of hydroquinone.

The curable compositions of the present invention also generally include a cure accelerator. The most useful accelerators are quaternary phosphonium salts, quaternary alkylammonium salts, or tertiary sulfonium salts. Particularly preferred accelerators are n-tetrabutylammonium hydrogen sulfate, tributylallylphosphonium chloride, benzyltriphenylphosphonium chloride, methyltributylammonium hydrogen sulfate, and tripropylammonium bromide. Other useful accelerators include those described in U.S. Pat. Nos. 5,591,804; 4,912,171; 4,882,390; 4,259,463 and 4,250,278 such as tributylbenzylammonium chloride, tetrabutylammonium bromide, tetrabutylammonium chloride, benzyl tris (dimethylamino)phosphonium chloride; 8-benzyl-1,8-diazabicyclo[5,4,0]-7-undecenonium chloride, $[(C_6H_5)_2S^+ (C_6H_{13})][Cl]^-$, and $[(C_6H_{13})_2S(C_6H_5)]^+[CH_3CO_2]^-$. In general, about 0.2 phr accelerator is an effective amount, and preferably about 0.35–1.5 phr is used.

If quaternary ammonium or phosphonium salts of bisphenols are used as curing agents, then addition of a cure accelerator is not necessary.

The curable compositions of the invention will also contain an acid acceptor such as a metal compound composed of a divalent metal oxide (e.g. magnesium oxide, zinc oxide, calcium oxide, or lead oxide), or a divalent metal hydroxide; or a mixture of the oxide and/or hydroxide with a metal salt of a weak acid, for example a mixture containing about 1–70 percent by weight of the metal salt. Among the useful metal salts of weak acids are barium, sodium, potassium, lead, and calcium stearates, benzoates, carbonates, oxalates, and phosphites. The amount of the metal compound added is generally about 1–15 phr, about 2–10 parts being preferred.

The compositions of the present invention also contain an organic peroxide curing agent. Compositions containing both polyhydroxy and organic peroxide curatives may cure faster than compositions which contain only a polyhydroxy compound or only an organic peroxide. In addition, the resulting cured article may have better physical properties (e.g. compression set) than articles cured only with a polyhydroxy compound or an organic peroxide.

Useful organic peroxides are those which generate free radicals at curing temperatures. A dialkyl peroxide or a bis(dialkyl peroxide) which decomposes at a temperature above 50° C. is especially preferred. In many cases it is preferred to use a ditertiarybutyl peroxide having a tertiary carbon atom attached to a peroxy oxygen. Among the most useful peroxides of this type are 2,5-dimethyl-2,5-di (tertiarybutylperoxy)hexyne-3 and 2,5-dimethyl-2,5-di (tertiarybutylperoxy)-hexane. Other peroxides can be selected from such compounds as dicumyl peroxide, dibenzoyl peroxide, tertiarybutyl perbenzoate, and di[1,3-dimethyl-3-(t-butylperoxy)butyl]carbonate. Generally, about 1–3 parts of peroxide per 100 parts of fluoroelastomer is used.

Another material which is contained in the composition of the invention is a coagent composed of a polyunsaturated compound which is capable of cooperating with the peroxide to provide a useful cure. These coagents can be added in an amount equal to 0.1 and 10 parts per hundred parts fluoroelastomer, preferably between 2–5 parts per hundred parts fluoroelastomer. The coagent may be one or more of the following compounds: triallyl cyanurate; triallyl isocyanurate; tri(methallyl)isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate (TAIC).

Other additives may be compounded into the fluoroelastomer to optimize various physical properties. Such additives include carbon black, stabilizers, plasticizers, lubricants, pigments, fillers, and processing aids typically utilized in perfluoroelastomer compounding. Any of these additives can be incorporated into the compositions of the present invention, provided the additive has adequate stability for the intended service conditions.

Carbon black is used in elastomers as a means to balance modulus, tensile strength, elongation, hardness, abrasion resistance, conductivity, and processability of the compositions. Carbon black is generally useful in amounts of from 5–60 phr.

In addition, or in the alternative, fluoropolymer fillers may be present in the composition. Generally from 1 to 50 phr of a fluoropolymer filler is used, and preferably at least about 5 phr is present. The fluoropolymer filler can be any finely divided, easily dispersed plastic fluoropolymer that is solid at the highest temperature utilized in fabrication and curing of the perfluoroelastomer composition. By solid, it is meant that the fluoroplastic, if partially crystalline, will have a crystalline melting temperature above the processing temperature(s) of the perfluoroelastomer(s). Such finely divided, easily dispersed fluoroplastics are commonly called micropowders or fluoroadditives. Micropowders are ordinarily partially crystalline polymers.

A preferred additive class includes molecular sieves, particularly zeolites. Molecular sieve zeolites are crystalline aluminosilicates of Group IA and Group IIA elements, such as sodium, potassium, magnesium, and calcium. Chemically, they are represented by the empirical formula: $M_{2/n}O.Al_2O_3 \cdot ySiO_2 \cdot wH_2O$ where y is 2 or greater, n is the cation valence, and w represents the water contained in the voids of the zeolite. Commercially available examples of such compositions include Molecular Sieve 3A, Molecular Sieve 4A, Molecular Sieve SA, and Molecular Sieve 13X, all available from Aldrich Chemical Co., Inc. Milwaukee, Wis. Use of this class of additives prevents sponging and improves heat aging of vulcanizates upon press curing in many instances. In general, use of about 1–5 phr is sufficient.

Other preferred additives include modified silane coated mineral fillers. By "modified silane" is meant that the silane contains at least one reactive functional group such as an amino group, or an epoxy group. The mineral fillers used in this invention are preferably somewhat alkaline, such as calcium metasilicates ($CaSiO_3$), especially wollastonite. Wollastonite coated with either an aminosilane or an epoxysilane is especially preferred. These compounds are commercially available from Quartzwerke GmbH of Freschen, Germany as Tremin®283 EST (epoxysilane treated wollastonite) and Tremin®283 AST (aminosilane treated wollastonite). These modified silane coated mineral fillers prevent sponging of the fluoroelastomer composition during press cure and also accelerate the cure rate. Generally, about 5 to 80 phr modified silane coated mineral filler is useful in the compositions of this invention, about 10 to 60 phr being preferred.

Organotin hydrides are another class of additive that may be employed. Tri-n-butyltin hydride (TBTH) is especially preferred. These tin hydride fillers accelerate the cure rate of the compositions of this invention and increase the modulus and improve the compression set resistance of the cured compounds. Generally, about 0.2 to 1.5 phr organotin hydride filler is useful, about 0.4 to 0.8 phr being preferred.

The crosslinking agents, coagent, accelerator, metal oxide, and other additives are generally incorporated into the polymer by means of an internal mixer or on a rubber mill. The resultant composition is then cured, generally by means of heat and pressure, for example by compression transfer or injection molding.

The curable compositions of the present invention are useful in production of gaskets, tubing, seals and other molded components. Such articles are generally produced by molding a compounded formulation of the curable composition with various additives under pressure, curing the part, and then subjecting it to a post cure cycle. The cured compositions have excellent low temperature flexibility and processability as well as excellent thermal stability and chemical resistance. They are particularly useful in applications such as seals and gaskets requiring a good combination of oil resistance, fuel resistance and low temperature flexibility, for example in fuel injection systems, fuel line connector systems and in other seals for high and low temperature automotive uses.

The invention is now illustrated by certain embodiments wherein all parts and percentages are by weight unless otherwise specified.

EXAMPLES

Test Methods

Cure Characteristics

Unless otherwise noted, cure characteristics were measured using an Alpha Systems model MDR 2000E moving die rheometer (MDR), under the following conditions:

Moving die frequency: 1.66 Hertz

Oscillation amplitude: ±0.5°

Temperature: 180° C.

Sample size: 7 to 8 g

Duration: 12 minutes

The following cure parameters were recorded:

$M_H$: maximum torque level, in units of dN·m $M_L$: minimum torque level, in units of dN·m Delta M: difference between maximum and minimum torque, in units of dN·m $t_s2$: minutes to a 2.26 dNm rise above $M_L$ tc50: minutes to 50% of maximum torque tc90: minutes to 90% of maximum torque Tensile Properties Unless otherwise noted, stress/strain properties were measured on test specimens that had been press cured at 180° C. for 15 minutes and then post cured in a hot air oven for 24 hours at 232° C. The following physical property parameters were recorded; test methods are in parentheses:

$M_{100}$: modulus at 100% elongation in units of MPa (ISO 37)

$T_B$: tensile strength in units of MPa (ISO 37)

$T_S$: tear strength in units of dN/m (ISO 34, Die B)

$E_B$: elongation at break in units of % (ISO 37)

TR-10: temperature of retraction (ISO 2921)

According to the TR test method, a standard test piece of length 50 mm is stretched at room temperature and then cooled in a bath (usually filled with isopropanol) to a temperature of about 10° C. less than the $T_g$ of the polymer. The test piece is then allowed to retract freely while the test temperature is raised at a rate of 1° C. per minute. Readings of the retracted length are taken every 2 minutes until the retraction reaches 75%. TR-10 is the temperature at which a retraction of 10% is achieved.

Hardness (Shore A, ISO 868)

Compression Set of Small Pip Samples (ISO 815)

Example 1

Polymer 1, a polymer of the invention, was prepared by semi-batch emulsion polymerization carried out at 80° C. in a well-stirred reaction vessel. A 41.5 liter reactor was charged with 63.25 grams of ammonium perfluorooctanoate and 27436.75 grams of deionized, deoxygenated water. The reactor was heated to 80° C. and then pressurized with 800 grams of a mixture of 42.3 mol % vinylidene fluoride, 29.1 mol % perfluoro(methyl vinyl ether), 25.6 mol % 1,1,3,3,3-pentafluoropropene (HPFP), and 3.0 mol % tetrafluoroethylene, bringing the reactor pressure to 1.48 MPa. A 16.0 ml aliquot of a mixture of 49.3 mol % 1,4-diiodoperfluorobutane, 34.8 mol % 1,6-diiodoperfluorohexane, 12.6 mol % 1,8-diiodoperfluorooctane, and 3.3 mol % 1,10-diiodoperfluorodecane was added to the reactor and the resulting mixture agitated 15 minutes. Next, 50.0 ml of a solution of 1% ammonium persulfate and 5% disodium phosphate heptahydrate were added to the reactor. As the reactor pressure dropped, a mixture of 51.4 mol % vinylidene fluoride, 22.6 mol % perfluoro(methyl vinyl ether), 1.1 mol % 1,1,3,3,3-pentafluoropropene, and 24.9 mol % tetrafluoroethylene was added to the reactor to maintain a 1.48 MPa pressure. After 155 grams of the 1% ammonium persulfate/5% disodium phosphate heptahydrate mixture had been added to the reactor, corresponding to the use of 9250 grams of monomer and an elapsed time of 24.0 hours, monomer feed to the reactor was halted and pressure reduced to atmospheric. The pH of the resulting latex was reduced to 3.3 with sulfuric acid. Latex was coagulated with 400 grams of potassium aluminum sulfate, washed with deionized water and then dried at 70° C. for two days. The polymer had a copolymerized monomer unit composition of 32.30 wt. % $VF_2$, 37.50 wt. % PMVE, 28.90 wt. % TFE, 1.20 wt. % HPFP and 0.13 wt. % iodine. Mooney viscosity, ML(1+10) at 121° C., was 93.

Polymer 1 was compounded on a two-roll rubber mill with the additives shown in Table I. Sample 1B is a composition of this invention. The other samples are controls of a similar composition cured with i) bisphenol only (1A) and ii) peroxide only (1C). Curing characteristics are reported in Table I. Compounds were press molded at 170° C. for 5 minutes and then post cured for 24 hours at 230° C. Physical properties of the cured compositions were measured according to the Test Methods and are also reported in Table I.

TABLE I

|  | 1A | 1B | 1C |
| --- | --- | --- | --- |
| Formulation, phr |  |  |  |
| Polymer 1 | 100 | 100 | 100 |
| MT Black[1] | 2.5 | 2.5 | 2.5 |
| Tremin 283 600 EST[2] | 45 | 45 | 45 |
| Calcium Oxide VG | 6 | 6 | 6 |
| Elastomag 170[3] | 1 | 1 | 1 |
| Molecular Sieves 13X | 3 | 3 | 3 |
| Bisphenol AF[4] | 2 | 1 | 0 |
| TBAHS[5] | 0.5 | 0.25 | 0 |
| VPA #2[6] | 1 | 1 | 1 |
| Peroxide[7] | 0 | 1.9 | 3.75 |
| Coagent[8] | 0 | 1.35 | 2.70 |
| Cure Characteristics |  |  |  |
| $M_L$, dNm | 2.72 | 3.15 | 3.41 |
| $M_H$, dNm | 32.75 | 42.18 | 34.09 |
| Delta M, dNm | 30.03 | 39.03 | 30.68 |

TABLE I-continued

|  | 1A | 1B | 1C |
|---|---|---|---|
| $t_s2$, minutes | 0.60 | 0.32 | 0.31 |
| tc50, minutes | 1.50 | 0.53 | 0.44 |
| tc90, minutes | 4.21 | 1.03 | 0.64 |
| Peak Rate, dNm/min | 17.7 | 98.3 | 120 |
| Physical Properties | | | |
| $T_B$, MPa | 13.40 | 16.90 | 16.50 |
| $E_B$, % | 144 | 135 | 195 |
| $M_{100}$, MPa | 10.4 | 14.6 | 11.1 |
| Hardness (Shore A) | 75.3 | 79.1 | 77.1 |
| Compression Set (70 hours at 200° C.), % | 23.8 | 19.6 | 24.9 |
| TR-10, ° C. | −21 | −22 | −22 |

[1]Thermax FF N 990 medium thermal carbon black (available from Lehmann & Voss Co.)
[2]Epoxysilane coated wollastonite
[3]Magnesium oxide (available from Morton Performance Chemicals, Inc.).
[4]4,4'(Hexafluoroisopropylidene)diphenol (available from DuPont Dow Elastomers L.L.C.)
[5]Tetrabutylammonium hydrogen sulfate (available from DuPont Dow Elastomers L.L.C.)
[6]Rice Bran Wax (available from DuPont Dow Elastomers L.L.C.)
[7]Luperox 101 XL 45 (available from Atofina)
[8]Diak #7 (TAIC) (available from DuPont Dow Elastomers L.L.C.)

What is claimed is:

1. A curable composition comprising:
   A. a fluoroelastomer copolymer consisting essentially of copolymerized units of 23–65 weight percent vinylidene fluoride, 25–75 weight percent perfluoro (alkyl vinyl)ether, 0–30 weight percent tetrafluoroethylene, and 0.3–5 weight percent 2-hydropentafluoropropene; said fluoroelastomer having between 0.05 and 1 weight percent iodine chemically bound at copolymer chain ends;
   B. a polyhydroxy crosslinking agent;
   C. a cure accelerator;
   D. an acid acceptor selected from the group consisting of metal oxides, metal hydroxides, and mixtures thereof;
   E. an organic peroxide; and
   F. a coagent.

2. A composition of claim 1 wherein the polyhydroxy crosslinking agent is selected from the group consisting of i) dihydroxy-, trihydroxy-, and tetrahydroxy-benzenes, -naphthalenes, and -anthracenes;
   ii) bisphenols of the formula

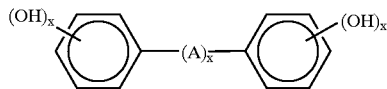

where A is a stable divalent radical; x is 0 or 1; and n is 1 or 2;
   iii) dialkali salts of said bisphenols, iv) quaternary ammonium and phosphonium salts of said bisphenols, v) tertiary sulfonium salts of said bisphenols, and vi) esters of phenols.

3. A curable composition of claim 1 wherein said cure accelerator is chosen from the group consisting of quaternary ammonium salts, tertiary sulfonium salts and quaternary phosphonium salts.

4. A curable composition of claim 1 wherein said organic peroxide is selected from the group consisting of 2,5-dimethyl-2,5-di(tertiarybutylperoxy)hexyne-3; 2,5-dimethyl-2,5-di(tertiarybutylperoxy)-hexane; dicumyl peroxide; dibenzoyl peroxide; tertiarybutyl perbenzoate; and di[1,3-dimethyl-3-(t-butylperoxy)butyl]carbonate.

5. A curable composition of claim 1 wherein said coagent is selected from the group consisting of triallyl cyanurate; triallyl isocyanurate; tri(methallyl)isocyanurate; tris (diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate.

6. A composition of claim 1 further comprising a zeolite.

7. A composition of claim 1 further comprising a modified silane coated mineral filler.

8. A composition of claim 7 wherein the modified silane coated mineral filler is selected from the group consisting of epoxysilane coated wollastonites and aminosilane coated wollastonites.

9. A composition of claim 1 further comprising a molecular sieve.

10. A curable composition consisting essentially of
    A) a fluoroelastomer copolymer consisting essentially of copolymerized units of 23–65 weight percent vinylidene fluoride, 25–75 weight percent perfluoro (alkyl vinyl)ether, 0–30 weight percent tetrafluoroethylene, and 0.3–5 weight percent 2-hydropentafluoropropene; said fluoroelastomer having between 0.05 and 1 weight percent iodine chemically bound to copolymer chain ends; and
    B) a compound selected from the group consisting of i) quaternary ammonium salts of a bisphenol, ii) quaternary phosphonium salts of a bisphenol and iii) tertiary sulfonium salts of a bisphenol;
    C) an acid acceptor selected from the group consisting of metal oxides, metal hydroxides, and mixtures thereof;
    D) an organic peroxide; and
    E) a coagent.

11. A curable composition of claim 10 wherein said organic peroxide is selected from the group consisting of 2,5-dimethyl-2,5-di(tertiarybutylperoxy)hexyne-3; 2,5-dimethyl-2,5-di(tertiarybutylperoxy)-hexane; dicumyl peroxide; dibenzoyl peroxide; tertiarybutyl perbenzoate; and di[1,3-dimethyl-3-(t-butylperoxy)butyl]carbonate.

12. A curable composition of claim 10 wherein said coagent is selected from the group consisting of triallyl cyanurate; triallyl isocyanurate; tri(methallyl)isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate.

13. A composition of claim 10 further comprising a zeolite.

14. A composition of claim 10 further comprising a modified silane coated mineral filler.

15. A composition of claim 14 wherein the modified silane coated mineral filler is selected from the group consisting of epoxysilane coated wollastonite and aminosilane coated wollastonite.

16. A composition of claim 10 further comprising a molecular sieve.

* * * * *

UNITED STATES PATENT AND TRADEMARK OFFICE
CERTIFICATE OF CORRECTION

PATENT NO.    : 6,326,436 B2
DATED         : December 4, 2001
INVENTOR(S)   : Stephen Bowers It is certified that error appears in the above-identified patent and that said Letters Patent is hereby corrected as shown below:

Column 11,
After line 46, the formula reading "$(OH)_x$" is hereby deleted and -- $(OH)_n$ -- is inserted in place thereof.

Signed and Sealed this

Twenty-fifth Day of June, 2002

*Attest:*

*Attesting Officer*

JAMES E. ROGAN
*Director of the United States Patent and Trademark Office*